United States Patent
Kling et al.

(10) Patent No.: US 12,337,985 B1
(45) Date of Patent: Jun. 24, 2025

(54) COMPLIANT DAMPENING WEDGE MOUNT

(71) Applicant: RTX Corporation, Farmington, CT (US)

(72) Inventors: Colin J. Kling, Exton, PA (US); Mark W. Costa, Storrs, CT (US)

(73) Assignee: RTX Corporation, Farmington, CT (US)

(*) Notice: Subject to any disclaimer, the term of this patent is extended or adjusted under 35 U.S.C. 154(b) by 0 days.

(21) Appl. No.: 18/826,854

(22) Filed: Sep. 6, 2024

(51) Int. Cl.
*B64D 33/02* (2006.01)
*F16F 15/08* (2006.01)

(52) U.S. Cl.
CPC .............. *B64D 33/02* (2013.01); *F16F 15/08* (2013.01); *B64D 2033/0206* (2013.01); *F05D 2220/36* (2013.01); *F05D 2230/60* (2013.01); *F05D 2260/96* (2013.01); *F16F 2234/00* (2013.01)

(58) Field of Classification Search
CPC .... F02C 7/04; F02C 7/045; B64D 2033/0206; B64D 33/02; F01D 21/045
See application file for complete search history.

(56) References Cited

U.S. PATENT DOCUMENTS

| | | | |
|---|---|---|---|
| 5,074,752 A | 12/1991 | Murphy et al. | |
| 6,857,669 B2* | 2/2005 | Porte | B64D 29/00 285/368 |
| 7,555,906 B2 | 7/2009 | Anichini et al. | |
| 8,231,332 B2* | 7/2012 | Vauchel | B64D 33/02 415/196 |
| 8,544,598 B2* | 10/2013 | Gaudry | F02C 7/045 415/119 |
| 8,650,853 B2* | 2/2014 | Porte | F02C 7/045 415/119 |
| 9,702,375 B2* | 7/2017 | Costa | F04D 29/644 |
| 9,951,954 B2 | 4/2018 | Benson et al. | |
| 10,174,633 B2* | 1/2019 | Hall | F01D 25/28 |
| 10,669,936 B2* | 6/2020 | Robertson, Jr. | B64D 33/02 |
| 11,325,717 B2* | 5/2022 | Porte | B64D 29/00 |
| 2023/0103861 A1* | 4/2023 | Bifulco | F01D 25/243 181/213 |

FOREIGN PATENT DOCUMENTS

CN 111038720 A * 4/2020 ............. B64D 47/00

* cited by examiner

*Primary Examiner* — Justin D Seabe
(74) *Attorney, Agent, or Firm* — Bachman & LaPointe, P.C.

(57) ABSTRACT

A retention assembly for a fan case liner including a retention bracket including a tab; a damper comprising a forward end opposite an aft end, the damper comprising an exterior surface extending between the forward end and the aft end, the damper having at least one slot formed in the exterior surface; a bracket slot formed in the damper proximate the aft end, the bracket slot configured to receive the tab; and the fan case liner comprising a fan case liner receiver configured to receive the damper, wherein the retention bracket and damper support the fan case liner.

17 Claims, 4 Drawing Sheets

COMPLIANT DAMPENING WEDGE MOUNT

BACKGROUND

The present disclosure is directed to the improved compliant dampening wedge mount.

There is a need to retain and simultaneously dampen additively manufactured fan case liners. These liners are produced from materials that are less capable (structurally) than legacy fan case liner materials used in this location on the engine. The liners will also be acoustically treated which is driving the design to minimize flow path irregularities for mounting the acoustically treated liners (i.e., bolts on the flow path). The liners establish the flow path aft of the fan rotor and ahead of the structural guide vanes (SGVs), and as such there is a need to control the liners position (radial and axial) closely. Given this environment, there is also a need to enable the liners to survive in a vibratory environment due to fan blade induced air pressure pulses as well as other engine vibrations.

The additive material of the liners presents challenges with respect to thermal growth as well as potential wear. The additive liners are predicted to grow substantially more than the neighboring hardware at hot running conditions. This thermal growth, coupled with somewhat poor bond strength, preclude one from simply bonding the liners to the fan case wall. The material is considerably softer than traditional metals that may be used at retention brackets, presenting a wear concern at metal-to-additive interfaces given the previously mentioned vibratory environment.

SUMMARY

In accordance with the present disclosure, there is provided a retention assembly for a fan case liner comprising a retention bracket including a tab; a damper comprising a forward end opposite an aft end, the damper comprising an exterior surface extending between the forward end and the aft end, the damper having at least one slot formed in the exterior surface; a bracket slot formed in the damper proximate the aft end, the bracket slot configured to receive the tab; and the fan case liner comprising a fan case liner receiver configured to receive the damper, wherein the retention bracket and damper support the fan case liner.

A further embodiment of any of the foregoing embodiments may additionally and/or alternatively include the fan case liner comprises a rear edge opposite a front edge, each of the rear edge and the front edge including at least one fan case liner receiver.

A further embodiment of any of the foregoing embodiments may additionally and/or alternatively include the damper being configured for an interference fit within the fan case liner receiver.

A further embodiment of any of the foregoing embodiments may additionally and/or alternatively include the damper comprises material configured compliant which deflects responsive to the interference fit.

A further embodiment of any of the foregoing embodiments may additionally and/or alternatively include the damper comprises a wedge shape having an interior edge dimension smaller than an exterior edge dimension.

A further embodiment of any of the foregoing embodiments may additionally and/or alternatively include the at least one slot being configured as channels with at least one of a U-shaped profile, a V-shaped profile and the like.

A further embodiment of any of the foregoing embodiments may additionally and/or alternatively include a width and depth of the at least one slot is tailored to adjust the stiffness of the damper.

In accordance with the present disclosure, there is provided a retention assembly for a fan case liner in a gas turbine engine fan case comprising a fan discharge flow path between a fan rotor and guide vanes; the fan case liner proximate a fan case exposed to the fan discharge flow path between the fan rotor and guide vanes; a forward retention bracket including a forward retention bracket tab in operative communication with the fan case; an aft retention bracket including an aft retention bracket tab in operative communication with the fan case; at least one damper comprising a forward end opposite an aft end, the at least one damper comprising an exterior surface extending between the forward end and the aft end, the damper having at least one slot formed in the exterior surface; a bracket slot formed in the damper proximate the aft end, the bracket slot of each at least one damper configured to receive one of the forward retention bracket tab or the aft retention bracket tab; and the fan case liner comprising a fan case liner receiver configured to receive the at least one damper, wherein the at least one damper supports the fan case liner.

A further embodiment of any of the foregoing embodiments may additionally and/or alternatively include the fan case liner comprises a front edge with a fan case liner receiver and a rear edge with a fan case liner receiver, wherein the forward retention bracket supports the front edge of the fan case liner and the aft retention bracket supports the rear edge of the fan case liner.

A further embodiment of any of the foregoing embodiments may additionally and/or alternatively include the at least one damper being configured for an interference fit within the fan case liner receiver.

A further embodiment of any of the foregoing embodiments may additionally and/or alternatively include the at least one damper comprises material configured compliant which deflects responsive to the interference fit.

A further embodiment of any of the foregoing embodiments may additionally and/or alternatively include the at least one damper comprises a wedge shape having an interior edge dimension smaller than an exterior edge dimension.

A further embodiment of any of the foregoing embodiments may additionally and/or alternatively include the at least one slot being configured as channels with at least one of a U-shaped profile, a V-shaped profile and the like.

In accordance with the present disclosure, there is provided a process for retention of a fan case liner with a retention assembly comprising forming a retention bracket including a tab; attaching a damper to the tab, the damper comprising a forward end opposite an aft end, the damper comprising an exterior surface extending between the forward end and the aft end, the damper having at least one slot formed in the exterior surface; a bracket slot formed in the damper proximate the aft end, the bracket slot configured to receive the tab; and inserting the damper into a fan case liner receiver of the fan case liner, wherein the retention bracket and damper support the fan case liner.

A further embodiment of any of the foregoing embodiments may additionally and/or alternatively include the fan case liner comprises a rear edge opposite a front edge, each of the rear edge and the front edge including at least one of the fan case liner receiver.

A further embodiment of any of the foregoing embodiments may additionally and/or alternatively include the process further comprising configuring the damper for an interference fit within the fan case liner receiver.

A further embodiment of any of the foregoing embodiments may additionally and/or alternatively include the process further comprising configuring the damper with compliant material which deflects responsive to the interference fit.

A further embodiment of any of the foregoing embodiments may additionally and/or alternatively include the process further comprising configuring the damper with a wedge shape having an interior edge dimension smaller than an exterior edge dimension.

A further embodiment of any of the foregoing embodiments may additionally and/or alternatively include the process further comprising adjusting the stiffness of the damper; and tailoring a width and a depth of the at least one slot.

A further embodiment of any of the foregoing embodiments may additionally and/or alternatively include the process further comprising configuring the at least one slot as channels with at least one of a U-shaped profile, a V-shaped profile and the like.

Other details of the compliant dampening wedge mount are set forth in the following detailed description and the accompanying drawings wherein like reference numerals depict like elements.

DETAILED DESCRIPTION

Figure 1:
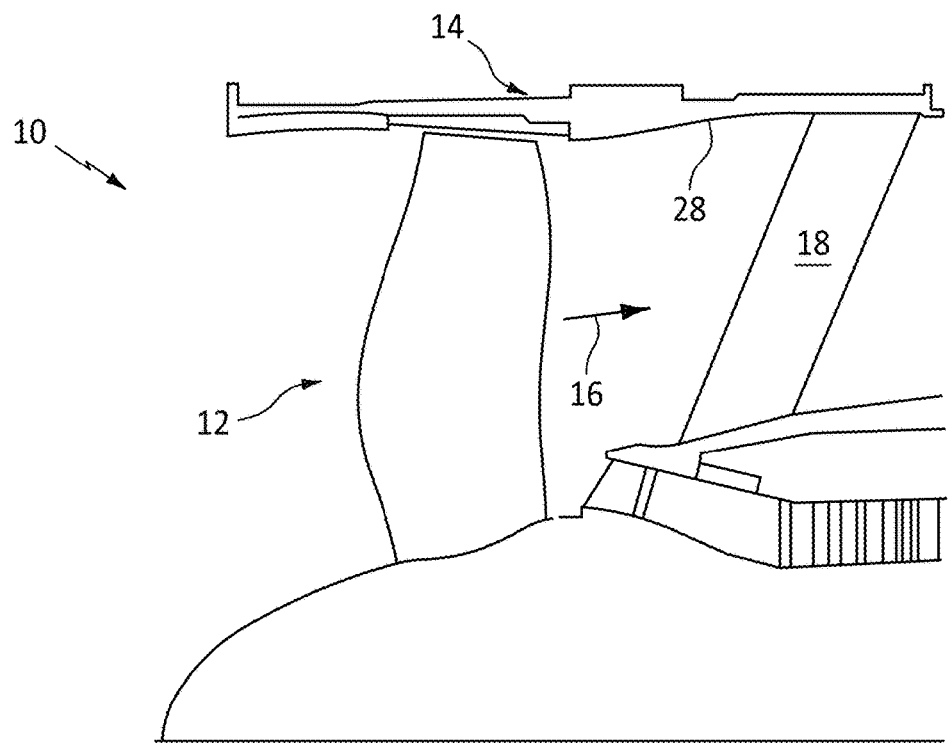
FIG. 1 is a partial cross sectional schematic representation of an exemplary fan section of a gas turbine engine.

Referring now to FIG. 1, an exemplary fan section 10 is shown. The fan section 10 includes a fan rotor 12 within a fan case 14. The fan case 14 can define a fan discharge flow path 16. Fan exit guide vanes 18 can support the fan case 14 aft and downstream of the fan rotor 12 within the flow path 16.

Figure 2:
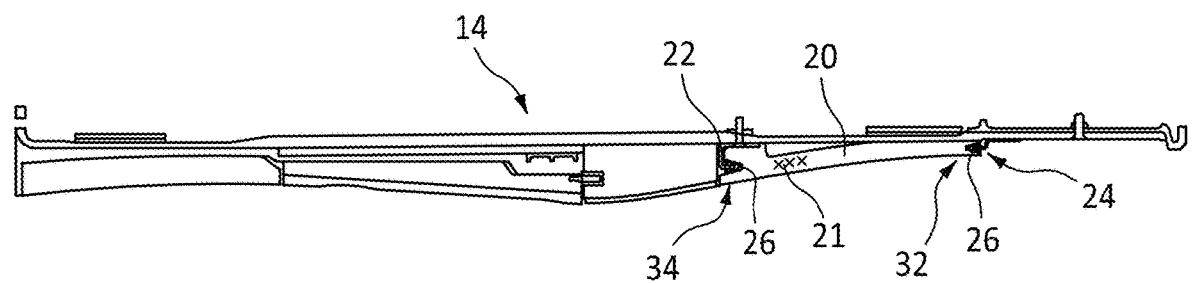
FIG. 2 is a cross sectional schematic representation of an exemplary fan case with exemplary liners.
Figure 3:
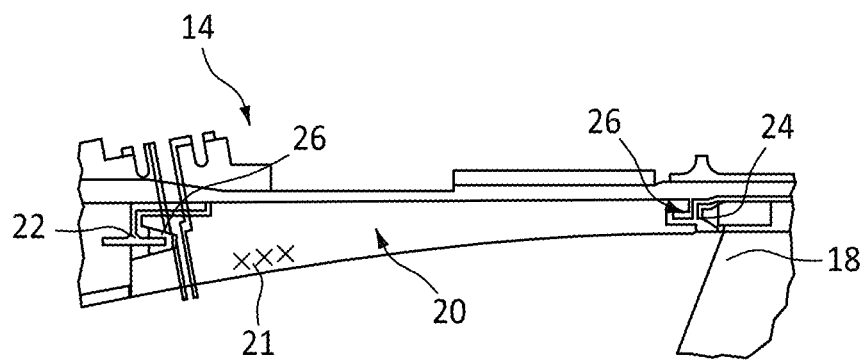
FIG. 3 is a partial cross sectional schematic representation of an exemplary liner with retention brackets.

Referring also to FIG. 2 and FIG. 3, the fan case 14 details are shown. The fan case 14 can include a fan case liner 20. The fan case liner 20 can be located aft of the fan rotor 12 and forward of the fan exit guide vane 18. The fan case liner 20 can be constructed through additive manufacturing techniques. The fan case liner 20 can include acoustic treatment 21. The acoustic treatment 21 can be employed to address sound within the fan case 14. A forward retention bracket 22 is mounted to the fan case 14 between the fan rotor 12 and the fan exit guide vanes 18. An aft retention bracket 24 is mounted to the fan case 14 aft of the forward retention bracket 22 and forward of the fan exit guide vane 18. The additive manufacturing materials employed to construct the fan case liner 20 can possess material properties, such as coefficient of thermal expansion, thermal growth that is different from the material properties of the retention brackets 22, 24 and/or fan case 14. The fan case liner 20 material can also be softer than the material of the retention brackets 22, 24. It is possible to have a metal-to-additive material interface between the retention brackets 22, 24 and the fan case liner 20.

Figure 4:
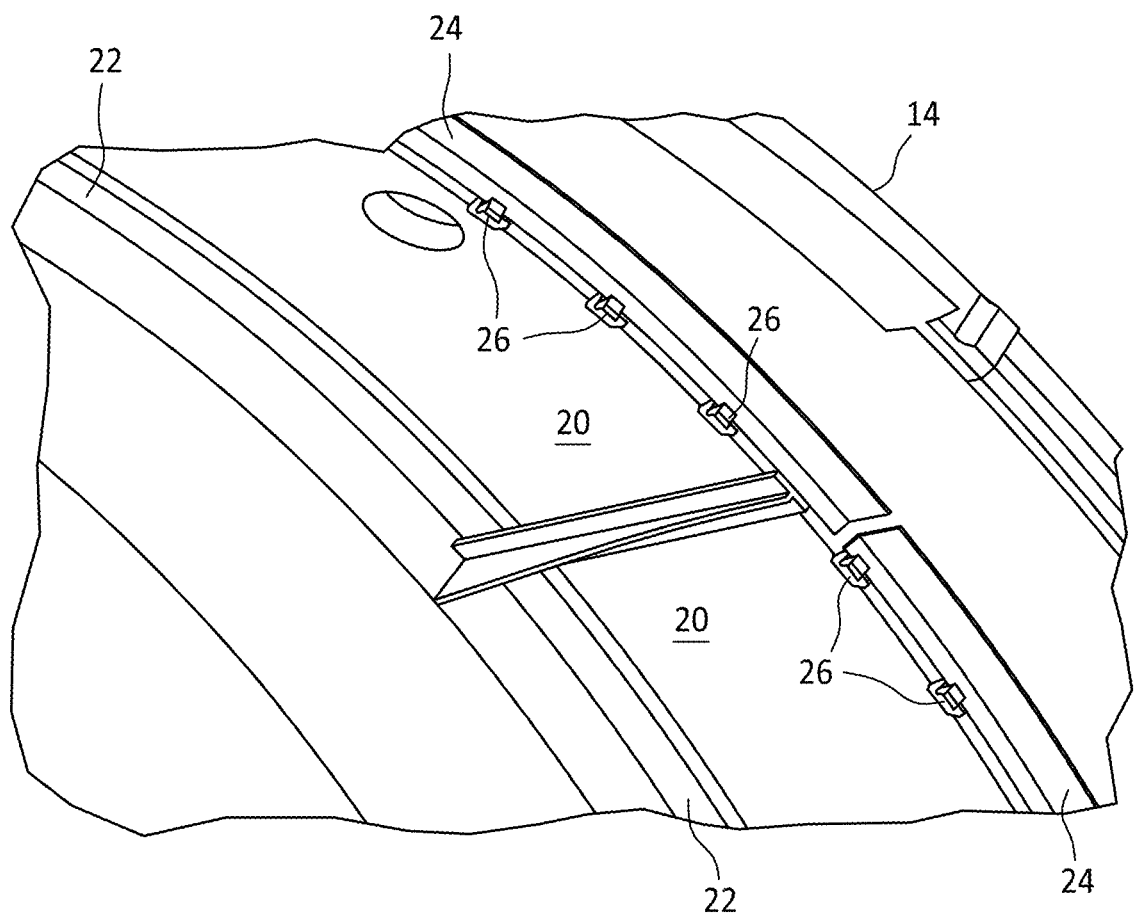
FIG. 4 is a partial isometric schematic representation of the fan case with exemplary liners.

Referring also to FIG. 4, an isometric view of the exemplary fan case liners can be seen. An exemplary damper 26 is in operative communication between the fan case liner 20 and each of the forward retention bracket 22 and the aft retention bracket 24. The damper 26 retains the fan case liner 20 with the forward retention bracket 22. Another damper 26 can retain the fan case liner 20 with the aft retention bracket 24. A retention assembly 28 of the fan case liner 20, the damper(s) 26 and each of the forward retention bracket 22 and aft retention bracket 24 retain the fan case liner 20 to the fan case 14 as well as establish both an axial position and a radial position of the fan case liner 20 within the fan case 14.

Figure 5:
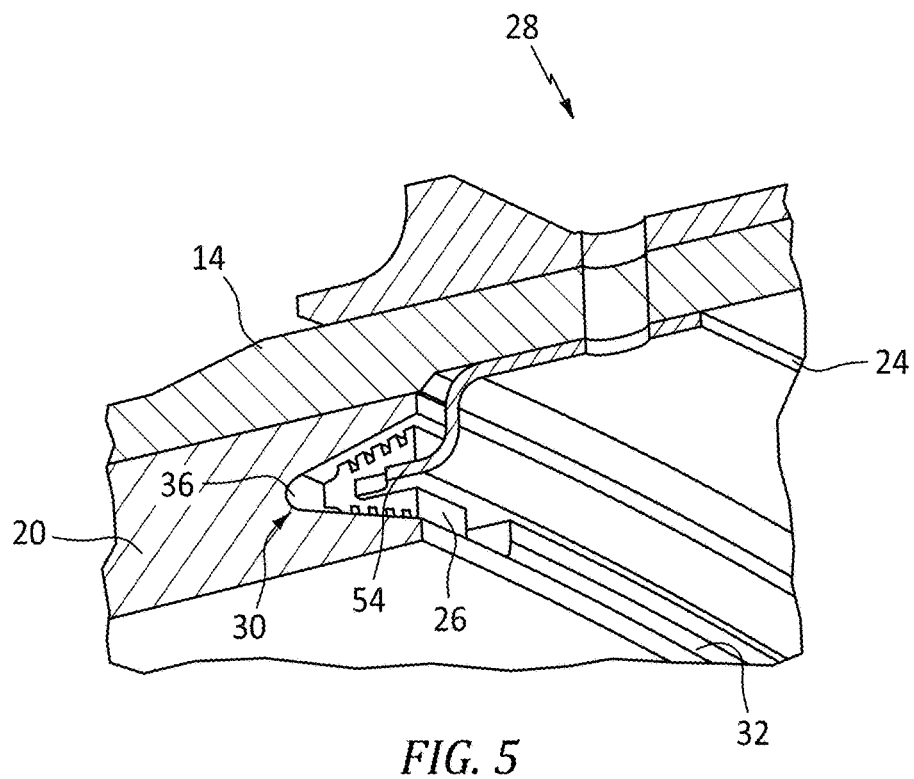
FIG. 5 is a partial cross sectional schematic representation of the exemplary wedge mount with retention bracket and liner.
Figure 6:
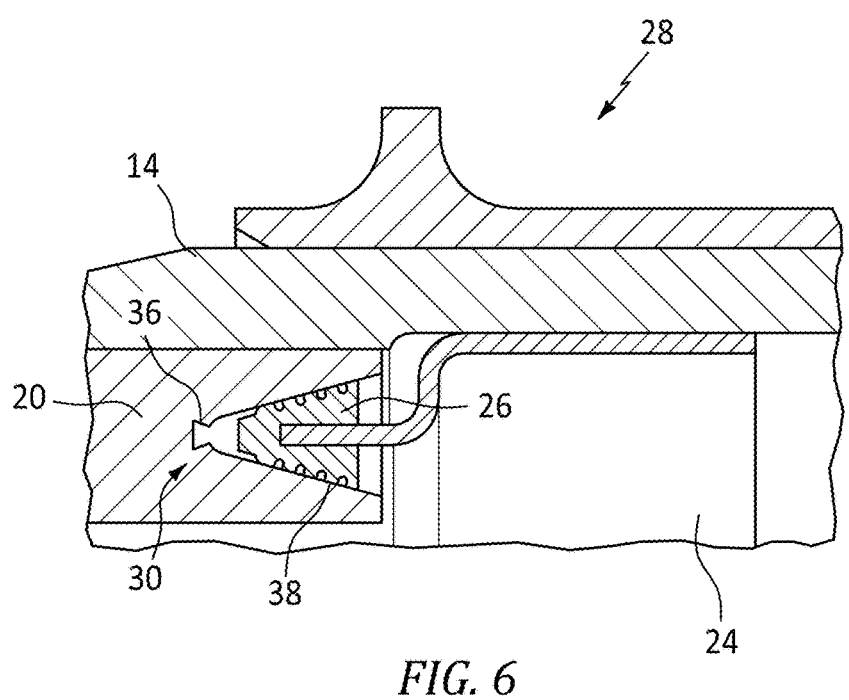
FIG. 6 is a partial cross section side view schematic representation of the exemplary wedge mount with retention bracket and liner.

Referring also to FIG. 5 and FIG. 6, details of the retention assembly 28 are shown. The fan case liner 20 includes a receiver 30 proximate a rear edge 32 and a front edge 34 (FIG. 2). The receiver 30 has a V-shaped cross section profile. It is contemplated that the receiver 30 can be C-shaped, U-shaped, wedge shaped and the like. In alternative embodiments, the receiver 30 can include a stress relief feature 36 that can be configured to reduce point stress. The stress relief feature 36 can include an open radius.

The damper 26 can be shaped to make an interference fit 38 within the receiver 30. The damper 26 can deform in response to the interference fit 38 within the receiver 30. The damper 26 can be wedge shaped having an interior edge dimension IE smaller than an exterior edge dimension EE. The damper 26 can be formed from material that is compliant and can deflect responsive to the interference fit 38. For example, the damper 26 can be fabricated from a compliant elastomer material, such as silicone, rubber or similar material. The wedge shape of the damper 26 can be asymmetric. The wedge shape of the damper 26 can be configured such that upon insertion into the fan case liner receiver 30 an outer diameter 42 of the damper 26 contacts the fan case liner receiver 30 first. By contacting the outer diameter 42 the opposite portion of the damper 26 can deform DF to make the interference fit 38. The damper 26 can deform both axially and circumferentially while maintaining a radial position.

The damper 26 can include a bracket slot 40. The bracket slot 40 can be shaped to receive the retention bracket 22, 24. The damper 26 can be attached to the retention bracket 22, 24 at the bracket slot 40. The damper 26 can be bonded to the retention bracket 22, 24. For example, an RTV adhesive can be employed to bond the damper 26 with the retention bracket 22, 24. The bracket slot 40 can be thicker proximate the interface with the bracket 22, 24. The retention bracket 22, 24 can be oriented to bias the damper 26 relative to the fan case liner receiver 30.

Figure 7:
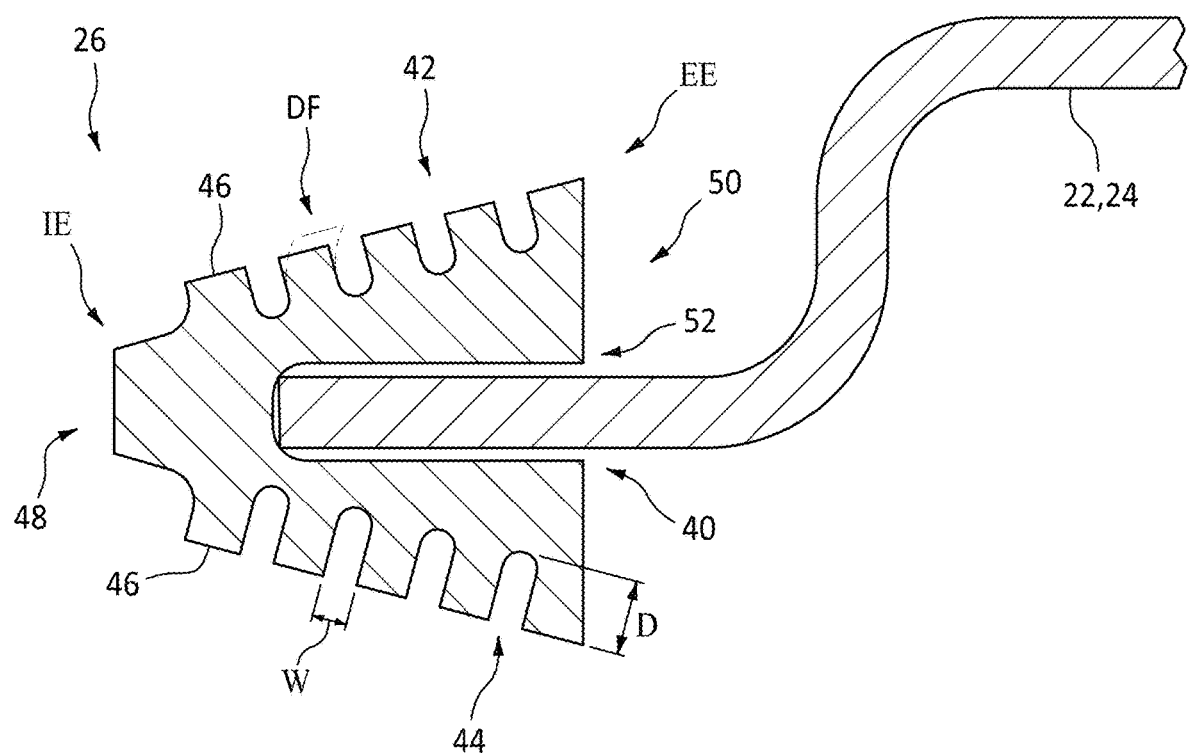
FIG. 7 is a cross sectional side view schematic representation of the exemplary of the fan rotor and bracket.

A slot(s) 44 can be formed along an exterior surface 46 of the damper 26. The slot 44 can be formed as channels with U-shaped profile, V-shaped profile and the like. The slot 44 can be aligned with the bracket slot 40 and run the length dimension (shown as into/out of the page of FIG. 7) of the damper 26. The slot(s) 44 allows for local deformation of the damper 26 material (i.e., axially leaning or rotating forward or aft). The slot(s) 44 also provides additional space into which the wedge material can deform DF due to Poisson effect locally. The width W and depth D of these slots 44 can be tailored to increase or decrease the overall stiffness of the damper 26. The slot width W and depth D can be preferentially sized to absorb tolerance accumulation and tune the retention load created by the damper 26 responsive to installation of the bracket 22, 24.

The damper 26 compliant material combined with the wedge shaped profile can be configured to limit the load that is transferred to the liner 20.

The damper 26 can include a forward end 48 and an aft end 50 opposite the forward end 48. The exterior surface 46 can extend from the forward end 48 to the aft end 50. The aft end 50 includes an opening 52 for the bracket slot 40. The slots 44 can be arrayed along the exterior surface 46 between the forward end 48 and the aft end 50. The forward retention bracket 22 and aft retention bracket 24 can include discrete tab(s) 54 that extend from the brackets 22, 24 to support the damper 26. The tab 54 can be insertable into the bracket slot 40 of the damper 26 (see FIG. 5).

A technical advantage of the disclosed compliant damper includes a device that is employed to retain and simultaneously dampen vibration experienced by fan case liners.

Another technical advantage of the disclosed compliant damper includes the necessary retention and positioning while limiting the load driven into the parts due to thermal expansion and the potential resulting mechanical load.

Another technical advantage of the disclosed compliant damper includes a retention scheme which limits interruption to the flow path.

Another technical advantage of the disclosed compliant damper includes a retention scheme which improves the volume of the liner that can be acoustically treated.

Another technical advantage of the disclosed compliant damper includes the damper can be shaped to make an interference fit within the receiver such that the damper can deform in response to the interference fit within the receiver.

There has been provided a compliant damper. While the compliant damper has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A retention assembly for a fan case liner comprising:
   a retention bracket including a tab;
   a damper comprising a forward end opposite an aft end, the damper comprising an exterior surface extending between the forward end and the aft end, the damper having at least one slot formed in the exterior surface;
   a bracket slot formed in the damper proximate the aft end, the bracket slot configured to receive the tab; and
   the fan case liner comprising a fan case liner receiver configured to receive the damper, wherein the retention bracket and damper support the fan case liner, wherein the damper comprises a wedge shape having an interior edge dimension smaller than an exterior edge dimension.

2. The retention assembly for a fan case liner according to claim 1, wherein the fan case liner comprises a rear edge opposite a front edge, each of the rear edge and the front edge including at least one fan case liner receiver.

3. The retention assembly for a fan case liner according to claim 1, wherein the damper being configured for an interference fit within the fan case liner receiver.

4. The retention assembly for a fan case liner according to claim 3, wherein the damper comprises material configured compliant which deflects responsive to the interference fit.

5. The retention assembly for a fan case liner according to claim 1, wherein the at least one slot being configured as channels with at least one of a a U-shaped profile and a V-shaped profile.

6. The retention assembly for a fan case liner according to claim 1, wherein a width and depth of the at least one slot is tailored to adjust the stiffness of the damper.

7. A retention assembly for a fan case liner in a gas turbine engine fan case comprising:
   a fan discharge flow path between a fan rotor and guide vanes;
   the fan case liner proximate a fan case exposed to the fan discharge flow path between the fan rotor and guide vanes;
   a forward retention bracket including a forward retention bracket tab in operative communication with the fan case;
   an aft retention bracket including an aft retention bracket tab in operative communication with the fan case;
   at least one damper comprising a forward end opposite an aft end, the at least one damper comprising an exterior surface extending between the forward end and the aft end, the damper having at least one slot formed in the exterior surface; a bracket slot formed in the damper proximate the aft end, the bracket slot of each at least one damper configured to receive one of the forward retention bracket tab or the aft retention bracket tab; and
   the fan case liner comprising a fan case liner receiver configured to receive the at least one damper, wherein the at least one damper supports the fan case liner, wherein the at least one damper comprises a wedge shape having an interior edge dimension smaller than an exterior edge dimension.

8. The retention assembly for a fan case liner in a gas turbine engine fan case according to claim 7, wherein the fan case liner comprises a front edge with a fan case liner receiver and a rear edge with a fan case liner receiver, wherein the forward retention bracket supports the front edge of the fan case liner and the aft retention bracket supports the rear edge of the fan case liner.

9. The retention assembly for a fan case liner in a gas turbine engine fan case according to claim 7, wherein the at least one damper being configured for an interference fit within the fan case liner receiver.

10. The retention assembly for a fan case liner in a gas turbine engine fan case according to claim 9, wherein the at least one damper comprises material configured compliant which deflects responsive to the interference fit.

11. The retention assembly for a fan case liner in a gas turbine engine fan case according to claim 7, wherein the at least one slot being configured as channels with at least one of a U-shaped profile, a U-shaped profile and a V-shaped profile.

12. A process for retention of a fan case liner with a retention assembly comprising:
   forming a retention bracket including a tab;
   attaching a damper to the tab, the damper comprising a forward end opposite an aft end, the damper comprising an exterior surface extending between the forward end and the aft end, the damper having at least one slot formed in the exterior surface; a bracket slot formed in the damper proximate the aft end, the bracket slot configured to receive the tab; and inserting the damper into a fan case liner receiver of the fan case liner, wherein the retention bracket and damper support the fan case liner, and configuring the damper with a wedge shape having an interior edge dimension smaller than an exterior edge dimension.

13. The process of claim 12, wherein the fan case liner comprises a rear edge opposite a front edge, each of the rear edge and the front edge including at least one of the fan case liner receiver.

14. The process of claim 12, further comprising:
configuring the damper for an interference fit within the fan case liner receiver.

15. The process of claim 14, further comprising:
configuring the damper with compliant material which deflects responsive to the interference fit.

16. The process of claim 12, further comprising:
adjusting the stiffness of the damper; and
tailoring a width and a depth of the at least one slot.

17. The process of claim 12, further comprising:
configuring the at least one slot as channels with at least one of a U-shaped profile, a V-shaped profile and the like a U-shaped profile and a V-shaped profile.

\* \* \* \* \*